(12) United States Patent
Frey et al.

(10) Patent No.: US 7,404,720 B1
(45) Date of Patent: Jul. 29, 2008

(54) ELECTRO MECHANICAL CONNECTOR FOR USE IN ELECTRICAL APPLICATIONS

(75) Inventors: Paul DeWitt Frey, San Francisco, CA (US); David Tse-Zhou Lu, Stanford, CA (US); David Frederick Lyons, II, Palo Alto, CA (US)

(73) Assignee: Tesla Motors, Inc., San Carlos, CA (US)

( * ) Notice: Subject to any disclaimer, the term of this patent is extended or adjusted under 35 U.S.C. 154(b) by 0 days.

(21) Appl. No.: 11/729,817

(22) Filed: Mar. 29, 2007

(51) Int. Cl.
*H01R 13/44* (2006.01)
(52) U.S. Cl. .................................. 439/133
(58) Field of Classification Search .............. 439/133, 439/145, 166, 137, 38, 34; 320/109
See application file for complete search history.

(56) References Cited

U.S. PATENT DOCUMENTS

| 5,639,256 A * | 6/1997 | Endo et al. ................. 439/358 |
| 6,054,779 A * | 4/2000 | Zubko ....................... 307/10.8 |
| 6,225,153 B1 * | 5/2001 | Neblett et al. ............... 438/188 |

* cited by examiner

*Primary Examiner*—Alexander Gilman
(74) *Attorney, Agent, or Firm*—Raggio & Dinnin, P.C.

(57) ABSTRACT

An electro mechanical connector for use in an electrical vehicle having a battery pack is disclosed. The connector includes a locking collar having a slot therein and a plug body arranged within the locking collar. The connector also has a switch mount sleeve arranged on the plug body and a micro switch connected to the switch mount sleeve at a predetermined position. The electrical connector also includes a switch actuator that is slidingly arranged within the slot and is aligned with the micro switch when the electrical mechanical connector is in its fully locked position.

18 Claims, 5 Drawing Sheets

ELECTRO MECHANICAL CONNECTOR FOR USE IN ELECTRICAL APPLICATIONS

BACKGROUND OF THE INVENTION

1. Field of the Invention

The subject invention generally relates to electro mechanical connectors for electrical circuits, and more particularly relates to an electro mechanical connector having a lock to control time delay on a first break pin and provide an electrical means to determine the locking state of the connector.

2. Description of Related Art

Electrical connectors have been known for numerous years. Many of these electrical connectors use a first mate last break (FMLB) configuration. The FMLB configuration will allow for a timing difference between electrical continuity of any two contact pairs in a connector body. Generally, in these prior art FMLB configurations two contacts of different lengths are installed within a connector body such that the shortest contact does not make a connection until after the longer contact is partially engaged. This will allow for a timing difference between the electrical continuity of the connector pairs wherein one is generally a hot pin and the other is generally either a negative or a ground. With many of these prior art connector mechanisms when separation of the connector body is to occur the reverse situation is applied and achieved. First, the shorter contact pair will fully disconnect before the longer contact pair or pairs will have separated from one another. This time difference between the signaling of the last mate first break pair and the next longest contact is dependent on the length difference of the contacts in the prior art and the speed at which the connector body may be separated by the operator of the electrical connector. Many of these prior art devices would rely on the connector body being more difficult to separate to achieve longer times between the disconnecting of the shortest contact pair with relation to the other contact pair or pairs or they would have longer contacts or connector bodies to accommodate the greater contact length difference between the contacts that are necessary to provide a safe method of disengaging high voltage connections.

Another prior art methodology for disconnecting and connecting electrical connectors uses a FMLB configuration along with a micro switch to determine if the two connector halves of the connector have been engaged. These prior art connectors use a micro switch to detect if the plug is fully seated into the receptacle. However, many of these prior art systems have problems in guaranteeing that the connector is locked into its appropriate position, nor do they allow for an independent motion to change the timing between the separation of the first break contact and the second break and thereafter contacts or pins.

Therefore, there is a need in the art for an improved electro mechanical connector for use in an electrical system. There also is a need in the art for an improved electrical connector for use in an electrical vehicle. Furthermore, there is a need in the art for an electrical connector that is allowed to be disconnected while under electrical load when the motion is initiated without having to use the contacts. There also is a need in the art for a methodology to remotely determine if an electrical connector is mated and locked before any unsafe voltages are applied to the connector. Still another need in the art is for a connector that creates a longer effective length difference between a last mate first break contact pair and the other contacts in the connector without having to add additional length to the connector body. Also there is a need in the art to provide a connector that has additional levels of safety for people engaged with high voltage connections that need to be energized in situations where complete electrical lockout is not feasible. There also is a need in the art for a low cost and easy to manufacture electrical connector for use in electrical vehicles and other industrial applications.

SUMMARY OF THE INVENTION

One object of the present invention may be to provide an improved electrical connector.

Another object of the present invention may be to provide a first mate last break electro mechanical connector that has a lock to control time delay on the first break pin.

Still another object of the present invention may be to provide an electrical connector that has an electrical means to determine the locking state of the connector.

Yet another object of the present invention may be to provide an electrical connector that has a mechanical actuator that physically locks the collar of a circular connector.

Still another object of the present invention may be to have a switch actuator that closes a normally open switch when the collar is placed in a locked position.

Still another object of the present invention may be to have a switch that is wired in series with a first break pin, such that when the switch is activated the first break pin will then only be electrically continuous when the connector is engaged and in its locked position.

Still another object of the present invention may be to provide an electrical connector with an actuation requirement via series wiring, this requirement will allow additional time between the breaking of the first break pin circuit and the disengagement of the other contacts or pins within the connector.

Still another advantage of the present invention may be to provide an electrical connector that allows signaling electrically to inline contactors in advance of the minimum insertion condition of the power pins to provide an effective hot disconnect using contacts not normally intended for breaking under electrical load.

To achieve the foregoing objects, an electrical connector having a mechanical actuator and locking mechanism is disclosed. The electrical connector includes a locking collar having a slot therein. The connector also includes a plug body arranged within the locking collar and a switch mount sleeve arranged over the plug body. The electrical connector has a micro switch connected to the switch mount sleeve and a switch actuator slidingly arranged within the slot of the locking collar.

One advantage of the present invention may be that it provides a novel and improved electrical connector for use in an electric vehicle or other industrial equipment.

Still a further advantage of the present invention may be that it provides for an electro mechanical connector for use in an electrical vehicle or other industrial applications that allows for a disconnect of a connector that is under electric load when the motion is initiated without having to use contacts that have been designed to withstand the arcing that occurs when a power contact separates.

Another advantage of the present invention may be that it provides a means to remotely determine if the connector is mated and locked before any unsafe voltages are applied to an electrical connector.

Still another advantage of the present invention may be that it creates a longer effective length difference between a last mate first break contact pair and the other contacts in a connector without adding additional length to the connector body.

Still a further advantage of the present invention may be that it provides greater levels of safety over connectors of the prior art where people are engaged with high voltage connections that need to be energized in situations where complete electrical lockout is not feasible.

Still another advantage of the present invention may be that the electro mechanical connector includes a lock to control time delay on the first break pin of the connector plug body.

Still another advantage of the present invention may be that it provides an electrical means to determine the locking state of the connector.

Yet another advantage of the present invention may be that a mechanical switch actuator physically locks the collar of the connector while also activating a normally open switch when in its locked position.

Still another advantage of the present invention may be that the switch is wired in series with the first break pin or last break pin of the FMLB configuration.

Still another advantage of the present invention may be that having the first break pin wired in series allows for it to be only electrically continuous when the connector is engaged and locked.

Still another advantage of the present invention may be that the activation requirement of the first break pin will allow additional time between the breaking of the first break pin circuit and a disengagement of the other pins or contacts in the plug body.

Yet another advantage of the present invention may be that it provides a predetermined amount of time for signaling to inline contacts in advance of the minimum insertion condition of the power contacts or pins to provide an effective hot disconnect using contacts or pins not normally intended for breaking under electrical load.

Other objects, features and advantages of the present invention will become apparent from the subsequent description and the appended claims, taken in conjunction with the accompanying drawings.

DESCRIPTION OF THE EMBODIMENT(S)

Figure 1:
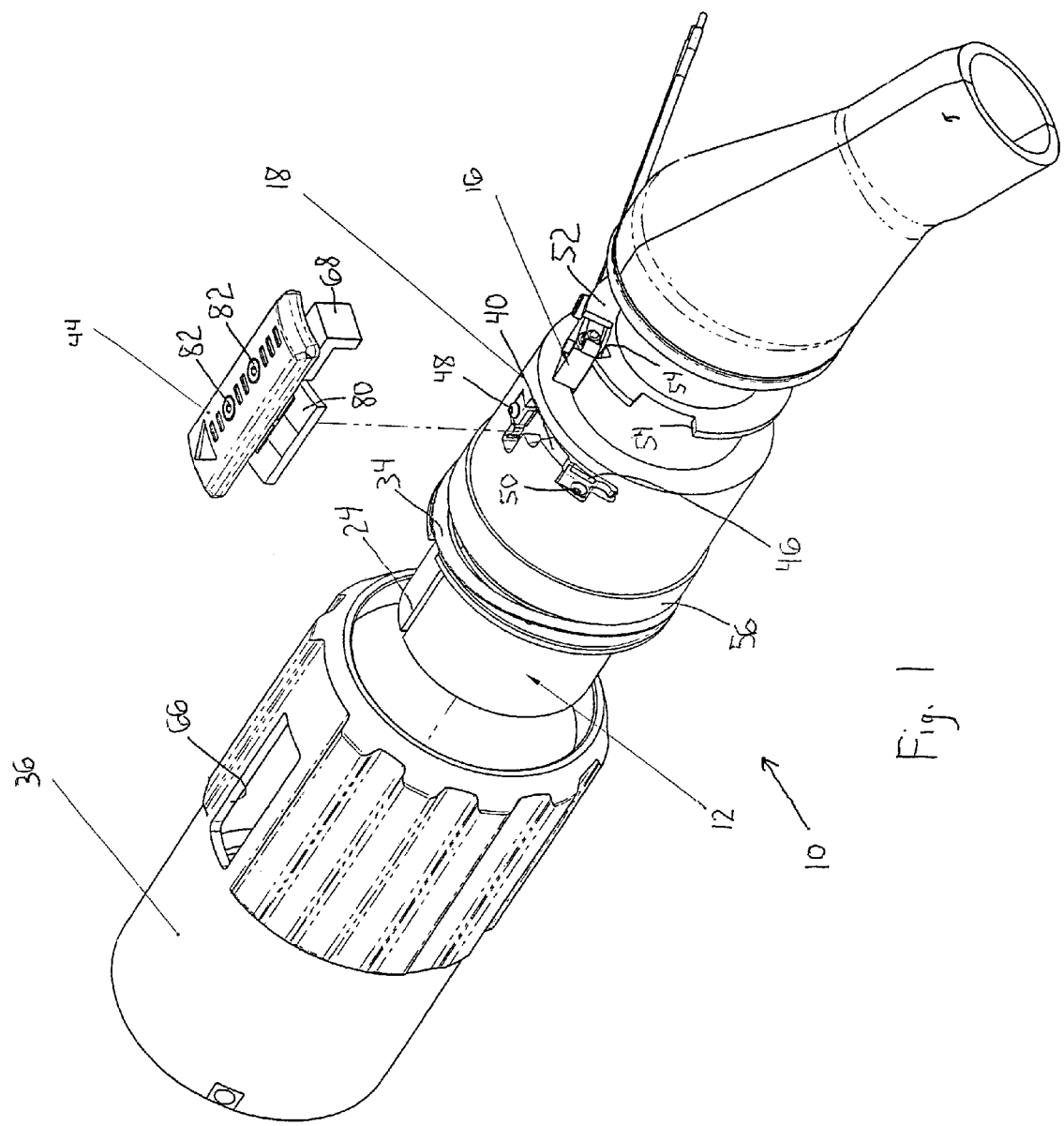
FIG. 1 shows an exploded view of an electrical connector according to the present invention.

Referring to the drawings, an electrical connector 10 for use in an electrical vehicle or other industrial equipment or applications is shown. It should be noted that the electrical connector 10 shown in the drawings is for use in an electrical vehicle, however the electrical connector 10 may be used in any combination and in any known design in any number of industries, including but not limited to, any type of vehicle, and any technology dealing with aerospace, marine, aviation, industrial equipment, and any other electrical system that has a need for high or low voltage electrical connectors for use in connecting electrical circuits and/or charging battery systems within components or vehicles. The connector 10 of the present invention will be able to lock such that it will provide a controlled time delay on the first break pin of a FMLB configuration within the plug body. The electrical connector 10 will also provide an electrical means to determine that the connector 10 is indeed engaged within its fully locked position via either a microchip and associated components, visual means or audible means. The present invention is also novel in that it will place a switch in series with a last mate first break contact or pin which will allow the initial contact disconnection to be independent of the connector body separation. The activation of the switch will then become an additional motion required by the user that will increase the time difference between the contact signaling which in turn may be extended further by requiring a second motion that must be performed before the connector body can begin to separate. This increased time will allow the controlling unit to de-energize the other contacts before they reach the minimal insertion length and may then be susceptible to arcing.

Figure 2:
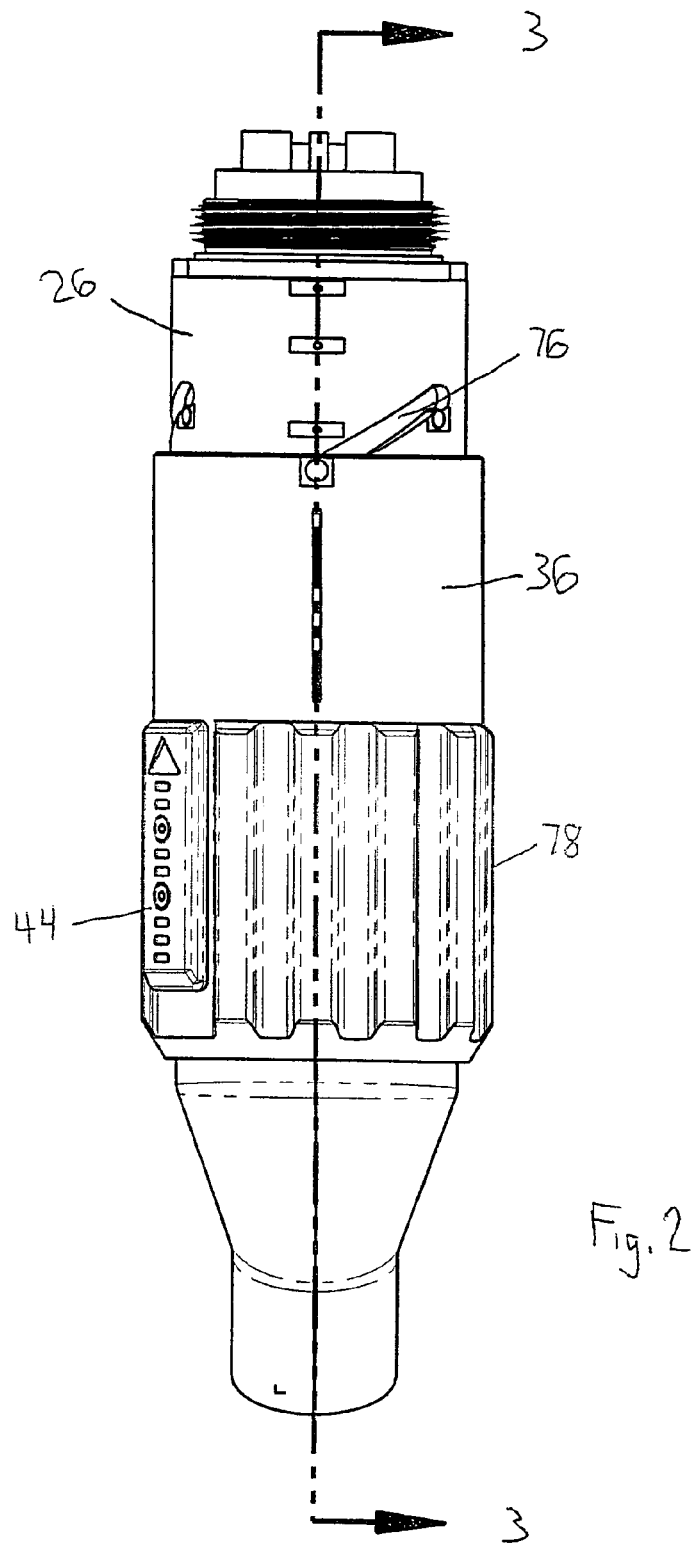
FIG. 2 shows a top view of an electrical connector according to the present invention in its unlocked position.
Figure 3:
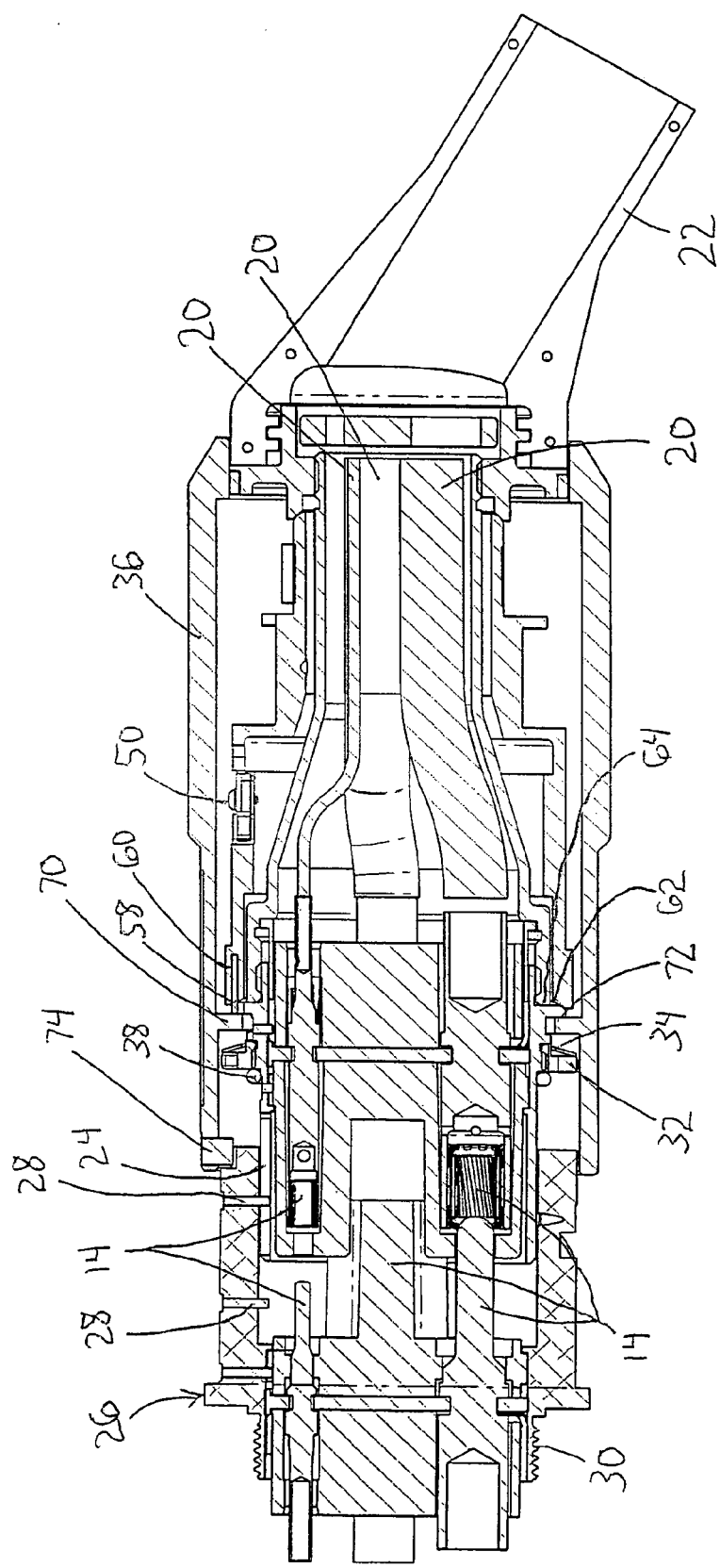
FIG. 3 shows a cross section of the unlocked electrical connector taken along line 3-3 of FIG. 2.
Figure 4:
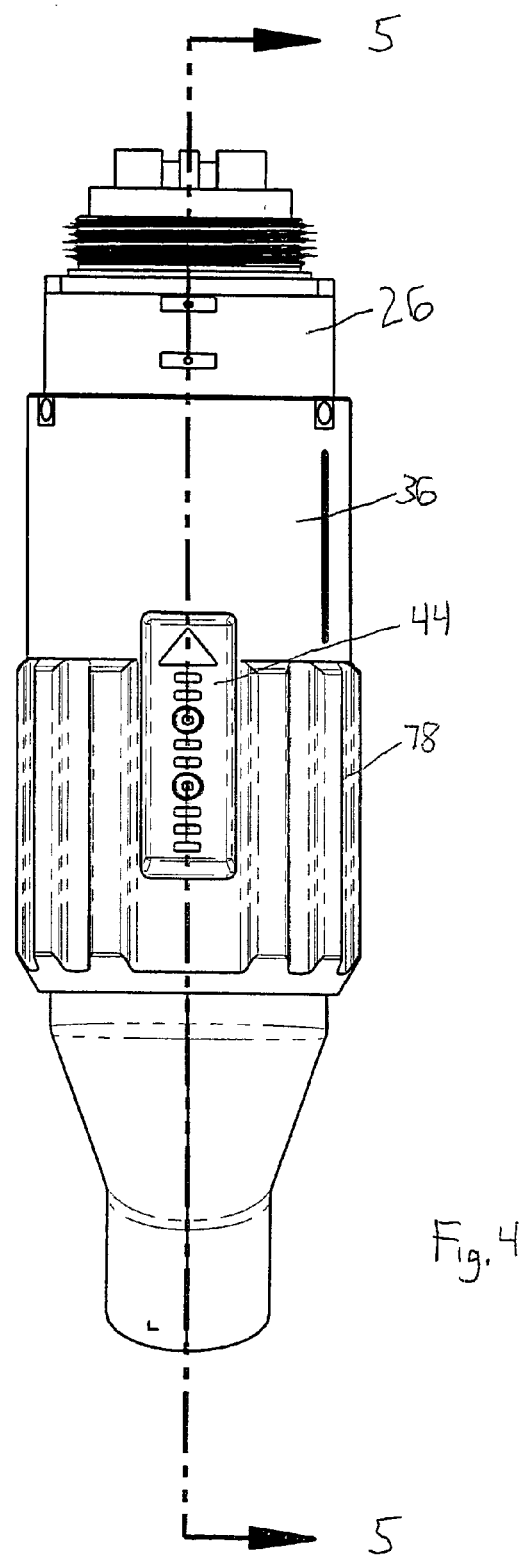
FIG. 4 shows a top view of an electrical connector in its locked position.
Figure 5:
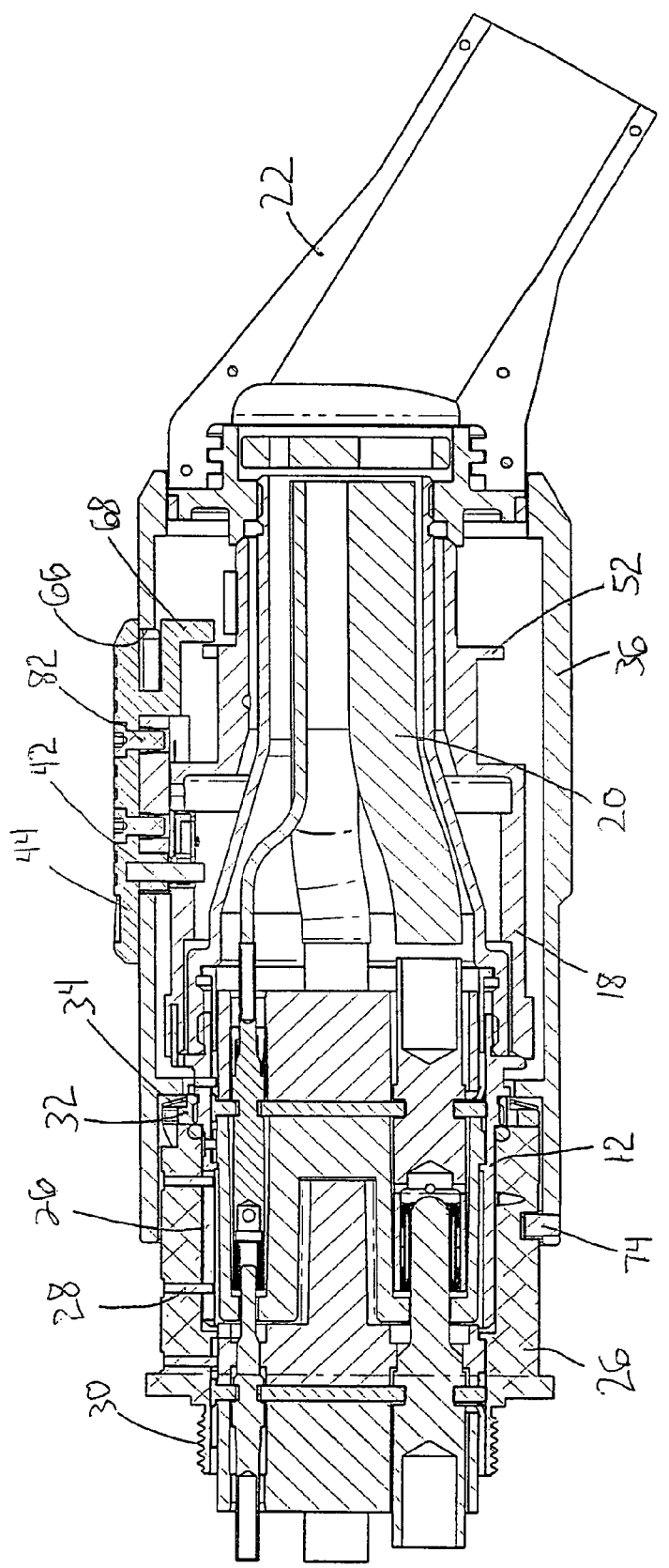
FIG. 5 shows a cross section of the electrical connector in its locked position taken along line 5-5 of FIG. 4.

The electro mechanical or electrical connector 10 having a mechanical switch therein is shown in FIGS. 1 through 5. The electrical connector 10 includes a plug body 12 which generally has a cylindrical shape and is generally used in a cylindrical connector 10. However, it should be noted that any other known shape other than cylindrical can be used for the plug body 12 depending on the design requirements and the environment in which the electrical connector 10 will be used. The plug body 12 is generally made of any known aluminum material, however any other ceramic, composite, metal, plastic or natural material may be used for the plug body 12 depending on the design requirements and the environment in which the electrical connector 10 will be used. The plug body 12 generally houses or has arranged therein contacts 14 of the electrical connector 10 which utilize a first mate last break (FMLB) configuration. The first mate last break configuration is well known in the art and generally has the first mate last break contact or pin 14 arranged as a power return or ground wire. The other contacts 14, of which there may be one or multiple other contacts or pins, generally may or may not include pre-charged capacitors, negative returns, along with the primary voltage or hot line within the electrical connection of the electrical connector 10. In many of the prior art systems the primary voltage or hot line was the shortest of the contacts while the power return or ground line generally was the longest of the contacts and the first to mate and last to break, thus allowing for disconnection of the electrical circuit and hence high voltage before the connector was completely separated.

In the embodiment shown the three contacts or pins 14 are arranged within the plug body 12 in a predetermined pattern. Generally, the last mate first break contact 14 is wired in series to a normally open switch 16, which in this case is a micro switch 16 that is connected to a switch mount sleeve 18 of the electrical connector 10. However, it should be noted that the first mate last break contact 14 may also be wired in series, along with any of the other contacts of the electrical configuration, with the micro switch 16 depending on the configuration and design requirements for the electrical connector 16. The plug body 12 has the contacts and receptacles wired to other components and cables 20 within the plug body bore such that the wires and cables 20 pass through one end of the plug body 12 to the necessary electrical equipment to which the electrical connector 10 connects the electrical circuit thereto. Hence, the plug body 12 is generally arranged between the power provider side of the electrical connection such as any known electrical grid or electrical storage or conversion equipment and thus includes batteries and other components. In the embodiment shown one end of the plug body 12 has an angled extension 22 extending from one end thereof to protect users from the wires connected to the contacts 14 within the plug body 12. It should be noted that the plug body 12 may also include a longitudinal groove 24 along an axis thereof on one surface thereof. The groove 24 will be used to receive and align the female portion 26 of the electrical connector 10 with respect to the male portion or plug body 12 of the electrical connector 10. The female portion 26 of the electrical connector 10 will have a plurality of alignment pins 28 arranged through a surface thereof which will interact with the groove 24 on the plug body 12 of the electrical connector 10, thus aligning the contacts or receptacles 14 with one another in the appropriate FMLB configuration. The female portion 26 of the electrical connector 10 also on one end thereof may include a threaded surface 30 that will allow for connection to any known electrical component within a vehicle or power supply side of the electrical connection. The plug body 12 also may include a circumferential flange 32 extending from a surface thereof that may have a spring 34 engaged on one side of the flange 32. The spring 34 may be used to engage with a lock collar 36 when the electrical connector 10 is in its fully locked position. A seal 38 may also be arranged against or near a surface of the circumferential flange 32 of the plug body 12. The seal 38 which in the embodiment shown is made of a rubber material, however it should be noted that any other plastic, rubber, composite, or natural material may be used for the seal 38. The seal 38 engages with a surface of the female portion 26 of the connector 10 when the electrical connector 10 is in its fully locked position. This will ensure no contamination within the inner bore and components of the connector 10 by dust, liquids or any other contaminates depending on the environment and positioning of the seal 38.

The electrical connector 10 also includes a switch mount sleeve 18 which is arranged over a predetermined portion of the plug body 12. The switch mount sleeve 18 generally will have a cylindrical shape, however any other known shape may be used depending on the design requirements of the electrical connector 10 and the environment in which it will be used. Generally, the switch mount sleeve 18 is made of a plastic material, however any other ceramic, plastic, rubber, composite, metal or natural material may be used for the switch mount sleeve 18. The switch mount sleeve 18 generally includes a track 40 arranged through one surface thereof. The switch mount sleeve 18 and hence the track 40 are rotationally keyed with respect to the plug body 12 to ensure that the track 40 will be properly aligned with the micro switch and switch actuator 44 at predetermined conditions. It should be noted that in this embodiment the track 40 has a generally L-shape, however the shape of the track 40 can be of any known shape or random shape and it can have an increase or decrease in the length of the legs of the L-shape member, or the shape may follow a tortuous path or have added friction built therein to increase the time between the last mate first break contact and the next shortest contact breaking. It should be noted that in the embodiment shown the L-shaped configured track 40 includes the long portion of the L-shape track 40 arranged along a rotational direction that allows for a predetermined rotational arc to occur for the locking collar 36 of the electrical connector 10. The other leg of the L-shaped track 40 generally is the shorter leg and lies in an orthogonal direction to the long portion of the L-shaped track 40. It should be noted that the length of the long portion of the L-shaped track 40 generally is the same as the amount of rotation required to move the locking collar 36 of the electrical connector 10 from its unlocked position to its fully or nearly fully locked position. It should be noted that either leg can have an increase or decrease in length, can have a tortuous path or have added friction to increase the time between the first break last mate contact 14 and the next shortest contact breaking within the electrical connector 10. It should be noted that the minimum length for the short portion of the L-shaped track 40 is defined by the diameter of a pin 42 that extends from a bottom of a switch actuator 44 and the tolerance of the micro switch 16 that is connected to or near the switch mount sleeve 18 within the electrical connector 10.

The switch mount sleeve 18 will also have a first locking member 46 arranged within the long portion of the L-shaped track 40 and a second locking member 48 arranged within the short portion of the track 40. These locking members 46, 48 will engage with the switch actuator 44 and hold the switch actuator 44 and locking collar 36 in either its locked position thus having the electrical connector 10 in its fully locked position or hold the switch actuator 44 and locking collar 36 in its unlocked position thus allowing for the electrical connector 10 to separate thus removing electrical flow therethrough. In the embodiment shown the first and second locking mechanisms 46, 48 generally include a spring action lock connected to a base portion wherein the base portions are arranged within pockets that are arranged within the L-shaped track 40 of the switch mount sleeve 18. The base portions are secured to the switch mount sleeve 18 via a fastener 50. It should be noted that any known fastener can be used to connect the first and second locking members 46, 48 to the switch mount sleeve 18. The switch mount sleeve 18 also may include a circular flange 52 extending from one portion thereof. The circular flange 52 may have a plurality of gaps or cutouts 54 therein through which the switch actuator 44 will be capable of passing therethrough. The circular flange 52 may also prevent the actuator 68 from over traveling thus protecting the micro switch 16 from a collision or jolt and possibly breaking or being damaged. The switch mount sleeve 18 may also have on one end a raised circumferential lip 56 thereon. The switch mount sleeve 18 may also include a pin 58 that extends from a front edge thereof and interacts and mates with a radial slot 60 in the plug body 12. It should also be noted that the plug body 12 may have a pin 58 that extends from a surface thereof and the switch mount sleeve 18 has a radial slot 60 in which the pin will interact and mate therewith. The use of this pin 58 and radial slot 60 configuration will allow for the switch mount sleeve 18 to be rotationally keyed and aligned to the plug body 12 so that the orthogonal short leg of the L-track 40 aligns with the pin 42 extending from the bottom of the switch actuator 44 when the locking collar 36 is in its fully locked position. It should further be noted that the switch mount sleeve 18 may include at least a pair of chamfered surfaces 62 that will mate with radial edges 64 on the plug body 12 to assure a concentric relationship between the plug body 12 and the switch mount sleeve 18. It should be noted that it also may occur where the plug body 12 has a pair of chamfered surfaces 62 that mate with and align with radial edges 64 of the switch mount sleeve 18 depending on the design requirements and the environment in which the connector 10 will be used.

The electrical connector 10 also includes a switch 16, in this embodiment it is a micro switch 16 which is normally open. It should be noted that one side of the micro switch 16 is wired in series to the last mate first break contact 14 arranged within the plug body 12. The other side of the micro switch 16 is then connected to a signal wire in the main cable of the electrical system of the electric vehicle or other industrial component in which the connector 10 is being used. The micro switch 16 is generally arranged and secured to the switch mount sleeve 18 at a predetermined position generally adjacent to the circular flange 52 as described above. Any known method of securing the micro switch 16 may be used to connect the micro switch 16 at the predetermined position on the switch mount sleeve 18 with relation to the locking collar 36. The micro switch 16 is secured to the switch mount sleeve 18 that the micro switch 16 is rotationally aligned with and in line with the switch actuator slot 66 which is arranged through the locking collar 36. The switch 16 is longitudinally positioned relative to a lip or tab 68 that extends from a bottom surface of the switch actuator 44 such that when the switch actuator 44 is moved or slid fully forward in the slot 68 within the locking collar 36 the tab 68 will engage and activate the micro switch 16 which is connected to the switch mount sleeve 18. It should be noted that the minimum length for the shortest portion of the L-track 40 of the switch mount sleeve 18 is defined by the diameter of the pin 42 on the switch actuator 44 and the tolerance of the micro switch 16 that is connected to the switch mount sleeve 18. It should be noted that any known micro switch 16 can be used as long as it is capable of being wired in series to the last mate first break contact and to the signal wire in the main cable of the electrical system of the electric vehicle.

The electrical connector 10 also includes a locking collar 36 which generally has a cylindrical shape. The locking collar 36 also includes a predetermined length and width slot 66 through a surface thereof. Arranged within the slot 66 of the locking collar 36 is a switch actuator 44 which moves in a sliding manner within the slot 66 along the longitudinal length of the slot 68. It should be noted that the slot 66 generally has a rectangular appearance, but any other shaped slot may be used, and that the switch actuator 44 slides along the entire length of the rectangular slot 66. The slot 66 is positioned within the locking collar 36 such that the slot 66 is in an easily accessible location for the user when the locking collar 36 is fully engaged in its fully locked position with the connector receptacle or female portion 26. It should be noted that the locking collar 38 also includes a circumferential flange 70 extending from an inner surface of the bore thereof. The circumferential flange 70 will be arranged at a predetermined position such that it is located between the circumferential flange 32 extending from an outer surface of the plug body 12 and an end surface of the switch mount sleeve 18. It should be noted that in the embodiment shown a second circumferential flange 70 extending from the plug body 12 will form a groove into which the circumferential flange 90 of the locking collar 36 will be arranged therein. It should also be noted that the locking collar 36 may have a pin 74 extending from or near an end portion of the inner surface of the locking collar 36. This pin 74 will interact with radial grooves 76 arranged in an outer surface of the female portion 26 of the electrical connector 10. It should be noted that the locking collar 36, switch mount sleeve 18 and switch actuator 44 generally are made of a plastic material, however any other plastic, ceramic, composite, natural material or metal may be used for the locking collar 36, switch mount sleeve 18 and switch actuator 44. The locking collar 36 also may have a grip surface 78 that will allow for easier rotational movement of the locking collar 36 with respect to the other portions of the electrical connector 10.

The switch actuator 44 which is arranged within the slot 68 of the locking collar 36 includes a flange 80 extending from a bottom surface thereof wherein the flange 80 is connected to the switch actuator 44 via any known fasteners 82. In the embodiment shown the fasteners 82 are a first and second screw 82, however any other known fastener can be used to connect the flange 80 of the switch actuator 44 to the switch actuator body. The combination of the flange 80 and switch actuator 44 will allow for the switch actuator 44 to be arranged within the slot 66 and then slidingly secured such that the switch actuator 44 will slide along the longitudinal axis of the electrical connector 10 a predetermined distance. The switch actuator 44 also will include a pin 42 extending from a bottom surface thereof a predetermined distance. The pin 42 will have a predetermined diameter and length that will allow for interaction of the pin 42 with the first and second locking members 46, 48 in the L-shape track 40 of the switch mount sleeve 18. The pin 42 will be arranged within the L-shaped track 40 and move within the L-shaped track 40 between one end of the long portion of the L-shaped track 40 to the other end of the L-shaped track on the short portion thereof. The movement will occur between the locking collar 36 fully unlocked position and fully locked position. The switch actuator 44 will also include a tab 68 extending from the bottom surface thereof. The tab 68 will generally have a predetermined shape that will allow for it to interact, engage and actuate the micro switch 16 which is connected to the switch mount sleeve 18 at a predetermined position. The tab 68 will be capable of activating the micro switch 16 only when the locking collar 36 is aligned with the short portion of the L-shaped track 40 within the switch mount sleeve 18 which in turn aligns it with the micro switch 16 that is mounted adjacent to the L-shaped portion of the track 40. The pin 42 will ride along the track 40 in the switch mount sleeve 18, such that it will prevent the locking collar 36 from rotating when the switch actuator 44 is in the orthogonal or short portion of the track 40. It should further be noted that the switch actuator tab 68 that protrudes from the bottom surface thereof will activate the micro switch 16 when the switch actuator 44 is moved fully forward in the orthogonal or short portion of the L-shaped track 40. This requires that the orthogonal portion of the track 40 be longer than the tolerance of the micro switch 16 such that the locking collar 36 is prevented from rotating before the micro switch 16 is activated. This is achieved when the pin 42 tangency has passed the corner of the L-shaped track 40. This will ensure that the user of the connector 10 is ensured that the contacts are fully engaged with the female portion of the electrical connector 10 before activating the micro switch 16 via the switch actuator 44 and thus allowing for electrical continuity to occur between the last mate, first break pin and the rest of the electrical circuit. Generally, the last mate first break pin is the hot or power portion of the electrical configuration. This will ensure that the electrical connector is grounded via the power return and any precharged capacitor pins or contacts before the hot or power pin is connected in the electrical circuit.

In operation, the plug body 12 of the electrical connector 10 will be aligned with the female portion 26 of the electrical connector 10 via the groove 24 and pins 28 as described above. The user will engage the first mate, last break contacts 14 with one another a predetermined amount until the locking collar pin 74 engages with the radial slots 76 on the female portion 26 of the electrical connector 10. Once this initial contact of the contacts 14 is made the user will rotate the locking collar 36 in a clock wise direction until the switch actuator 44 aligns with the short or orthogonal portion of the L-shaped track 40 within the switch mount sleeve 18. This clock wise rotation of the locking collar 36 will serve to fully engage the contacts and receptacle of the plug body 12 and female portion 26 of the electrical connector 10. To this point the first mate, last break and any other contacts have been fully engaged along with the last mate, first break contact being fully engaged. However, no power has been applied to the last mate, first break contact 14 until the switch actuator 44 is moved in a longitudinal direction along the axis of the electrical connector 10 by the user thus, activating and engaging the micro switch 16 via the tab 68 extending from the bottom surface of the switch actuator 44. Upon activation of the micro switch 16 the micro switch 16 which is wired in series with the last mate, first break power contact 14 of the electrical connector 10 will allow for the electrical circuit to be completely connected and charging or passing of the electrical voltage, which generally is a high voltage to occur between the power supply and the component being charged or receiving the electrical voltage. The use of the mechanical switch actuator 44 provides a predetermined time frame between contact 14 of the last mate, first break contact to the electrical circuit during both connection and disconnection of the hot electrical circuit. The electrical mechanical actuator 44 will control the time delay on the first break pin and provide an electrical means to determine the locking state of the connector. With the micro switch 16 also wired to the main cable, it will allow for the user of the electrical connector to know that the electrical connector is fully engaged and locked and transmitting power when the switch actuator 44 engages the micro switch 16 via visual or audible means. With the mechanical switch actuator 44 physically locking the collar 36 of the circular connector the user can be confident that the normally open switch 16 is in its fully locked position, thus allowing the first break pin to only be electrically continuous when the connector is fully engaged and locked. Furthermore, the activation requirement through the series wiring, will allow additional time between the breaking of the first break pin circuit and disengagement of the other pins. This time will allowing signaling to in line contactors in advance of the minimum insertion condition of the power pins to provide an effective hot disconnect using contacts not normally intended for breaking under electrical load.

Thus, during disconnection the operator of the electrical connector will slide the switch actuator 44 in the opposite direction, thus disengaging the switch actuator tab 68 from the micro switch 16 and thus opening the circuit thus cutting off power flow within the electrical connector 10 for the last mate, first break contact pair. Next the operator of the electrical connector 10 will rotate the locking collar 36 in a counterclockwise direction opposite to that used to lock the connector 10. This will disengage the connector 10 and begin disengagement of the last mate, first break contact thus providing a safe manner to disconnect a hot electrical connector. The amount of time can vary for the actuator pin 42 to travel along the length of the L-shaped or other shaped track. By placing the micro switch 16 in series with the last mate, first break contact 14 this will allow the electrical connector 10 of the present invention to have an initial contact disconnection to be independent of the connector body separation. The actuation of this switch 16 then becomes an additional motion required by the user to disconnect the hot electrical connection thus creating a time difference between the contact signaling that may be extended by requiring a second motion that must be performed before the connector body 10 can begin to separate. This time will allow the controlling unit to deenergize the other contacts before they reach the minimal insertion length and may be susceptible to arcing during disconnection or connection of the electrical connector 10.

It should be noted that the electrical connector 10 of the present invention can be used to allow disconnecting a connector that is under electrical load when the motion is initiated without having to use contacts that have been designed to withstand the arcing that occurs when a powered contact separates. It should also be noted that it provides a means to remotely determine if the electrical connector is mated and locked before any unsafe voltages are applied to the electrical connector 10. Furthermore, it should be noted that the use of this electrical connector 10 will create a longer effective length difference between the last mate, first break contact pair and the other contacts in the connector without adding additional length and costs to the connector body. This electrical connector 10 will also provide additional levels of safety where people are engaged with high voltage connections in electrical vehicles or other industrial applications that need to be energized in situations where complete electrical lock out is not feasible.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An electrical connector, said connector comprising:
   a locking collar,
   a plug body arranged within said locking collar;
   a switch mount sleeve arranged over said plug body, said switch mount sleeve having a generally "L" shaped track therein;
   a micro switch connected to said switch mount sleeve;
   a switch actuator slidingly arranged in said locking collar; and
   a pin that extends from a surface of said switch actuator.

2. The connector of claim 1 wherein said locking collar having a switch actuator slot, said micro switch is aligned with said track when the connector is in a locked position.

3. The connector of claim 1 wherein said pin travels in said track and prevents said locking collar from rotating when predetermined conditions occur.

4. The connector of claim 1 wherein said switch mount sleeve having a pair of chamfered surfaces that engage with radial edges of said plug body.

5. The connector of claim 1 wherein said plug body having contacts with a first mate last break (FMLB) configuration.

6. The connector of claim 5 wherein one of said contacts is wired in series to said micro switch.

7. The connector of claim 1 wherein said switch actuator having a tab extending from a bottom surface thereof.

8. The connector of claim 7 wherein said tab activates said micro switch when the connector is in a locked position.

9. The of claim 1 wherein said plug body having a radial slot therein.

10. The connector of claim 9 wherein said switch mount sleeve or said locking collar having a second pin extending therefrom, said second pin is arranged within said radial slot.

11. An electromechanical connector for use in an electric vehicle having a battery pack therein, aid connector comprising:
    a locking collar having a slot therein;
    a plug body arranged within sad locking collar;
    a switch mount sleeve arranged over said plug body;
    a micro switch connected to said switch mount sleeve;
    a switch actuator slidingly arranged within said slot, said switch actuator aligns and engages said micro switch when the connector is locked; and
    a pin extending from a bottom surface of said switch actuator, said pin travels engages and interacts with a first locking member when the connector is unlocked and engages and interacts with a second locking member when the connector is locked.

12. The connector of claim 11 further comprising an "L" shaped tack in said switch mount sleeve, a long portion of said track is arranged along a predetermined rotational arc while a short portion of said track is orthogonal to said long portion.

13. The connector of claim 11 wherein said switch actuator having a tab extending from a surface thereof, said tab actuates said micro switch upon said engagement thereof.

14. The connector of claim 11 wherein said switch mount sleeve having a second pin g therefrom, said second pin engages with a radial slot in said plug body.

15. The connector of claim 11 wherein said switch mount sleeve having a pair of chamfered surfaces that interact and mate with a radial edge on said plug body.

16. The connector of claim 11 further comprising a FMLB contact arranged within said plug body and other contacts arranged within said plug body.

17. The connector of claim 16 wherein said last mate first break contact is wired in series to said micro switch.

18. An electromechanical connector for use in an electric vehicle having a batter pack therein, said connector comprising:
    a locking collar having a slot therein;
    a plug body arranged within said locking collar;
    a switch mount sleeve arranged over said plug body;
    a micro switch connected to said switch mount sleeve;
    a switch actuator slidingly arranged within said slot;
    a "L" shaped track arranged in said switch mount sleeve, a long portion of said track is arranged along a predetermined rotational arc while a short portion of said track is orthogonal to said long portion; and
    a first locking member arranged within said long portion of said track and a second locking member arranged within said short portion of said track.

* * * * *

UNITED STATES PATENT AND TRADEMARK OFFICE
CERTIFICATE OF CORRECTION

PATENT NO.         : 7,404,720 B1
APPLICATION NO.    : 11/729817
DATED              : July 29, 2008
INVENTOR(S)        : Paul DeWitt Frey et al.

It is certified that error appears in the above-identified patent and that said Letters Patent is hereby corrected as shown below:

Col. 10, Line 52, Claim 11 - Please delete "aid" and insert -- said -- after "pack therein"

Col. 10, Line 55, Claim 11 - Please delete "sad" and insert -- said -- after "arranged within"

Col. 10, Line 62, Claim 11 - Please insert missing words -- within a track between an unlocked position and locked position of the connector, said pin -- after "said pin travels"

Col. 10, Line 67, Claim 12 - Please delete "tack" and insert -- track -- after "shaped"

Col. 11, Line 7, Claim 14 - Please delete "g" and insert -- extending -- after "having a second pin"

Col. 12, Line 2, Claim 18 - Please delete "batter" and insert -- battery -- after "vehicle having a"

Signed and Sealed this

Thirtieth Day of September, 2008

JON W. DUDAS
*Director of the United States Patent and Trademark Office*